(12) United States Patent
Sultenfuss et al.

(10) Patent No.: US 11,251,645 B2
(45) Date of Patent: Feb. 15, 2022

(54) MULTIMODE USB-C POWER TRANSMISSION AND CONVERSION SUPPORTING IMPROVED BATTERY CHARGING

(71) Applicant: Dell Products, L.P., Round Rock, TX (US)

(72) Inventors: Andrew Thomas Sultenfuss, Leander, TX (US); Richard C. Thompson, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 96 days.

(21) Appl. No.: 16/751,684

(22) Filed: Jan. 24, 2020

(65) Prior Publication Data

US 2021/0234393 A1 Jul. 29, 2021

(51) Int. Cl.
*H02J 7/04* (2006.01)
*H02J 7/00* (2006.01)
*G06F 1/28* (2006.01)
*G06F 1/3203* (2019.01)

(52) U.S. Cl.
CPC .................. *H02J 7/04* (2013.01); *G06F 1/28* (2013.01); *H02J 7/0045* (2013.01); *H02J 7/0047* (2013.01); *H02J 7/0068* (2013.01); *G06F 1/3203* (2013.01)

(58) Field of Classification Search
CPC .......... H02J 7/04; H02J 50/80; H02J 2310/22; H02J 7/0045; H02J 7/0047; H02J 7/0048; H02J 7/0068; H02J 7/00034; H02J 7/0003; H02J 7/00047; H02J 7/007; H02J 2207/10; G06F 1/28; G06F 1/3203; G06F 1/266

See application file for complete search history.

(56) References Cited

U.S. PATENT DOCUMENTS

| | | | |
|---|---|---|---|
| 9,030,155 B1 * | 5/2015 | Li | H02J 7/0003 320/107 |
| 9,287,732 B2 * | 3/2016 | Carobolante | H04B 5/0037 |
| 10,170,928 B2 * | 1/2019 | Dong | H02J 7/34 |
| 10,554,067 B2 * | 2/2020 | Zhang | H02J 7/007182 |
| 11,031,788 B2 * | 6/2021 | Park | H02J 7/007182 |
| 11,043,806 B2 * | 6/2021 | Dendas | H05B 45/50 |

(Continued)

*Primary Examiner* — Helen Rossoshek
(74) *Attorney, Agent, or Firm* — Fogarty LLP

(57) ABSTRACT

Systems and methods are provided for charging a battery system of an Information Handling System (IHS) using a multimode AC adapter. Information reported by the multimode adapter is used to determine its capabilities, including whether it supports USB-PD transmission and also supports high-power transmissions of a voltage greater than the USB-PD voltages. The charge state of the battery system is monitored. When the battery is in a pre-charge state, the battery is charged using USB-PD transmissions negotiated with the multimode adapter. When the battery is in a bulk-charge state, the battery is charged using a high-power transmission negotiated with the multimode adapter. When the battery is in a top-off-charge state, the battery is charged using USB-PD transmissions negotiated with the multimode adapter. In light of the charging efficiency of a battery varying based on its charge level, the multimode adapter supports efficient charging at different charge levels.

20 Claims, 5 Drawing Sheets

(56) References Cited

U.S. PATENT DOCUMENTS

| | | | |
|---|---|---|---|
| 2012/0196658 A1* | 8/2012 | Sun | H01M 50/209 |
| | | | 455/573 |
| 2013/0113415 A1* | 5/2013 | Chen | B65D 19/385 |
| | | | 320/107 |
| 2015/0280475 A1* | 10/2015 | Li | H02J 7/00 |
| | | | 320/107 |
| 2016/0226245 A1* | 8/2016 | Ellenberger | H02J 7/0003 |
| 2017/0294790 A1* | 10/2017 | Tian | H02J 7/0068 |
| 2017/0310129 A1* | 10/2017 | Chang | H02J 7/0045 |
| 2017/0331162 A1* | 11/2017 | Clarke | H02J 7/00714 |
| 2017/0338670 A1* | 11/2017 | Zhang | G01R 31/2874 |
| 2018/0026469 A1* | 1/2018 | Kamath | H02J 7/04 |
| | | | 320/106 |
| 2018/0027934 A1* | 2/2018 | Akin | H02J 7/35 |
| 2018/0069397 A1* | 3/2018 | Dendas | H05B 45/3725 |
| 2018/0241231 A1* | 8/2018 | Zhang | H02J 7/007194 |
| 2018/0375357 A1* | 12/2018 | Sultenfuss | H02J 7/342 |
| 2019/0229633 A1* | 7/2019 | Perreault | H01F 27/2804 |
| 2020/0119410 A1* | 4/2020 | Tian | H02J 7/00714 |
| 2020/0119581 A1* | 4/2020 | Kim | H02J 50/80 |
| 2020/0295581 A1* | 9/2020 | Li | H02J 7/00036 |
| 2020/0326767 A1* | 10/2020 | Iyer | G06F 1/3215 |
| 2020/0348723 A1* | 11/2020 | Wood, III | G06F 13/385 |
| 2020/0366116 A1* | 11/2020 | Yang | H02J 7/007182 |
| 2021/0091576 A1* | 3/2021 | Zhang | H02J 7/0024 |
| 2021/0167623 A1* | 6/2021 | Sanghvi | H02J 7/0045 |
| 2021/0194287 A1* | 6/2021 | Qu | H04B 5/0037 |

* cited by examiner

MULTIMODE USB-C POWER TRANSMISSION AND CONVERSION SUPPORTING IMPROVED BATTERY CHARGING

FIELD

This disclosure relates generally to Information Handling Systems (IHSs), and more specifically, to charging portable IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs, such as laptops, tablets and mobile phones, are portable and are designed to operate using power supplied by rechargeable batteries. Power drawn from an electrical outlet may be used to charge the batteries of a portable IHS. Since the batteries of IHSs operate using DC (Direct Current) power, an AC adapter (i.e., AC/DC adapter or AC/DC converter) is required to convert the AC power from the wall outlet to DC power that can be used to charge the batteries. In some instances, AC adapters may provide DC power to an IHS via a cylindrical, barrel connector that couples with a corresponding DC power port receptable of the IHS. In some instances, DC power may be additionally or alternatively provided via a USB (Universal Serial Bus) coupling. The USB Power Delivery (USB-PD) Specification specifies communications between an AC adapter and an IHS that enable negotiation of various supply voltages that are supported by the AC adapter and that may be provided to the IHS via a USB port. The IHS utilizes the provided power in charging one or more rechargeable batteries of a battery system, from which the IHS powers the operations of the IHS. In many instances, the charging efficiency of the replaceable batteries of an IHS may vary based on the power level of the batteries.

SUMMARY

In various embodiments, methods are provided for charging a battery system of an Information Handling System (IHS) using a multimode AC adapter. The methods may include: determining, based on information reported by the multimode AC adapter, the multimode AC adapter supports USB-PD transmission and also supports high-power transmissions of a voltage greater than voltages of the supported USB-PD transmissions; monitoring a charge state of the battery system; when the charge state comprises a pre-charge state, charging the battery system using a first USB-PD transmission negotiated with the multimode AC adapter; when the charge state comprises a bulk-charge state, charging the battery system using a high-power transmission negotiated with the multimode AC adapter; and when the charge state comprises a top-off-charge state, charging the battery system using a second USB-PD transmission negotiated with the multimode AC adapter.

In additional method embodiments, the high-power transmission comprises a nominal voltage of approximately 54 volts and a peak voltage not exceeding 60 volts. In additional embodiments, the methods may further include configuring a power circuit of the IHS for converting the high-power transmission to a voltage for using in charging the battery system. In additional method embodiments, the power circuit comprises a plurality of digital voltage dividers operable for converting the high-power transmission to the voltage utilized by the battery system. In additional method embodiments, the operation of the power circuit generates greater than 200 watts of power in converting the high-power transmission to the voltage utilized by the battery system. In additional method embodiments, the pre-charge state comprises a low charge level of the battery system. In additional method embodiments, the low charge level of the battery system limits efficient charging of the battery system to the use of a low charging current. In additional method embodiments, the bulk-charge state comprises a charge level of the battery system supporting charging of the battery system using a standard charging current. In additional method embodiments, the top-off-charge state comprises a voltage level of the battery system greater than a voltage limit of the power circuit.

In various additional embodiments, systems are provided for charging a battery system of an Information Handling System (IHS). The systems may include a multimode AC (Alternating Current) adapter configured to report supported transmissions comprising USB-PD (Universal Serial Bus Power Delivery) transmissions and further comprising high-power transmissions of a voltage greater than voltages of the of USB-PD transmissions. The systems may further include an IHS configured to: monitor a charge state of the battery system; when the charge state comprises a pre-charge state, charge the battery system using a first USB-PD transmission negotiated with the multimode AC adapter; when the charge state comprises a bulk-charge state, charge the battery system using a high-power transmission negotiated with the multimode AC adapter; and when the charge state comprises a top-off-charge state, charge the battery system using a second USB-PD transmission negotiated with the multimode AC adapter.

In additional system embodiments, the high-power charging transmission comprises a nominal voltage of approximately 54 volts and a peak voltage not exceeding 60 volts. In additional system embodiments, the IHS may be further configured to utilize a power circuit of the IHS for converting the high-power transmission to a voltage for using in charging the battery system. In additional system embodiments, the operation of the power circuit generates greater than 200 watts of power in converting the high-power transmission to the voltage utilized by the battery system. In additional system embodiments, the pre-charge state comprises a low charge level of the battery system. In additional system embodiments, the bulk-charge state comprises a charge level of the battery system supporting charging of the battery system using a standard charging current. In additional system embodiments, the top-off-charge state comprises a voltage level of the battery system greater than a voltage limit of the power circuit.

In various additional embodiments, Information Handling Systems (IHSs) are provided that support power transmissions by a multimode AC adapter. The IHSs may include: one or more processors; a memory device coupled to the one or more processors, the memory device storing computer-readable instructions that, upon execution by the one or more processors, cause execution of an operating system of the IHS; a battery system; and an embedded controller comprising a memory having program instructions stored thereon that, upon execution by a logic unit of the embedded controller, cause the embedded controller to: determine, based on information reported by the multimode AC adapter, the multimode AC adapter supports USB-PD transmission and also supports high-power transmissions of a voltage greater than voltages of the supported USB-PD transmissions; monitor a charge state of the battery system; when the charge state comprises a pre-charge state, charge the battery system using a first USB-PD transmission negotiated with the multimode AC adapter; when the charge state comprises a bulk-charge state, charge the battery system using a high-power transmission negotiated with the multimode AC adapter; and when the charge state comprises a top-off-charge state, charge the battery system using a second USB-PD transmission negotiated with the multimode AC adapter.

In additional IHS embodiments, the high-power transmission comprises a nominal voltage of approximately 54 volts and a peak voltage not exceeding 60 volts. In additional system embodiments, the pre-charge state comprises a low charge level of the battery system. In additional system embodiments, the top-off-charge state comprises a voltage level of the battery system greater than a voltage limit of a power circuit used to convert the high-power transmission to a voltage for using in charging the battery system.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
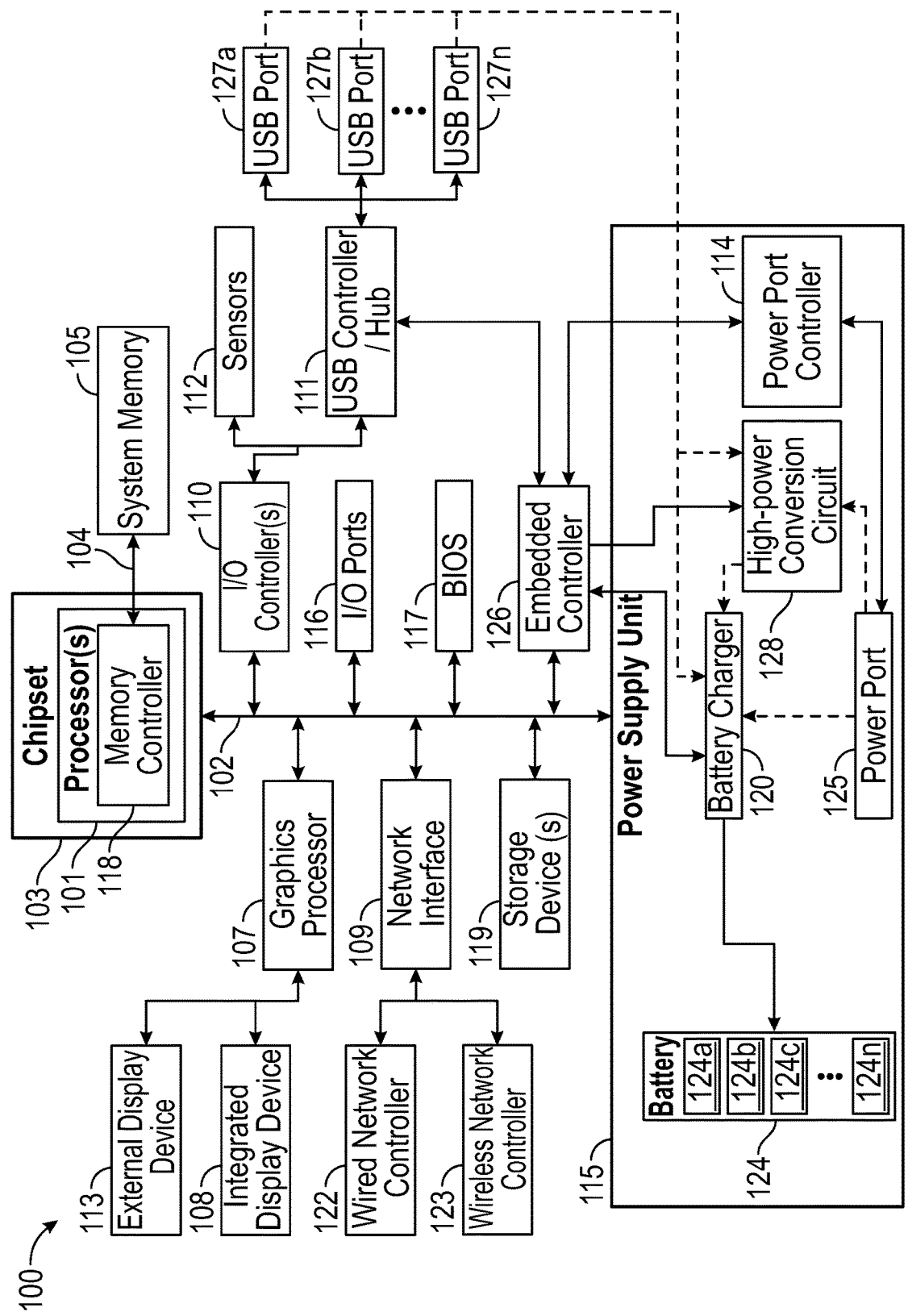
FIG. 1 is a block diagram depicting certain components of an IHS operable according to various embodiments for multimode USB-C power transmission and conversion in support of improved battery charging.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, certain portable IHSs may utilize AC adapters for providing power from an electrical outlet that is converted to a DC output that is used in powering a portable IHS and/or recharging internal batteries of a portable IHS. As IHSs become thinner, and thus more portable, it is preferable that the AC adapters used for charging portable IHSs also remain as thin and as portable as possible. The adoption of thinner charging connectors promotes thin portable IHSs and thin AC adapters. For instance, USB-C connectors may support providing an IHS with charging inputs and may be considerably thinner than USB Type A connectors, as well as being thinner than the cylindrical barrel connectors that are commonly supported by IHS power ports.

While IHSs become increasingly thinner and more portable, the power requirements for portable IHSs are not necessarily decreasing. As described with regard to FIG. 1, certain portable IHSs such as laptops may include multi-core processors, a separate graphics processor, significant amounts of memory, persistent storage drives, specialized microcontrollers and one or more integrated displays. Such high performance portable IHSs may have significant power demands, in some cases greater than 200 watts. In some instances, portable IHSs may have power demands as high as 250 watts. In many instances, portable IHSs may also be expected to serve as a source of power for external devices coupled to the portable IHS. USB-C power adapters utilize thin cabling that limits power transmissions to 5 amps. Since charging voltages specified by USB-PD protocols are limited to 20 volts, existing USB-C power adapters are limited to providing less than 100 watts of power.

In order to be classified as NEC (National Electrical Code) Class 2 or Class 3 power supply units, the output of a power supply must be less than 60 volts. Power supplies with voltage outputs greater than 60 volts may be considered to pose a risk of fire or electric shock and may thus be subject to additional circuit protection requirements. Accordingly, embodiments provide support for AC power adapters capable of transmitting output voltages up to 60 volts that may be used to provide upwards of 200 watts of power to IHSs. As described in additional detail below, embodiments may support transmission of supply voltages up to 60 volts via USB-C couplings and may convert the transmitted supply voltage to high-power charging outputs greater than 200 watts through the use of a high-efficiency, high-power conversion circuit of the IHS. Power adapters according to embodiments that support transmission of supply voltages up to 60 volts may be USB-C power adapters that utilize the various pins supported by USB-C connectors to support use of data lines and power supply lines between an IHS and a coupled device. Using these USB-C couplings, the power supply lines may support bi-directional charge transfer where the IHS may either be supplied with power or may serve as a source of power. Using the high-power conversion circuit of IHS embodiments, USB-C power adapter may support transmission of voltages up to 60 volts, as well as transmission of supply voltages supported by the USB-PD specifications (e.g., 5V, 9V, 15V, 20V), thus providing multimode charging outputs.

FIG. 1 is a block diagram depicting certain components of an IHS 100 operable according to various embodiments for multimode USB-C power transmission and conversion in support of improved charging of the batteries of IHS 100. As described in additional detail below, a multimode power adapter may provide IHS 100 with high-power charging inputs via a USB-C coupling, such as charging inputs exceeding 200 watts, while also supporting charging of IHS 100 via USB-PD inputs. In various embodiments, IHS 100 may include an embedded controller 126 that includes logic that executes program instructions, in conjunction with operations by components of power supply unit 115 and USB controller 111, to perform the operations disclosed herein for configuring multimode USB-C power transmission and conversion. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, sensors 112 accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127a-n supported by IHS 100.

In some embodiments, USB controller 111 may control the distribution of both data and power transmitted via USB ports 127a-n. For instance, USB controller 111 may support data communications with USB devices that are coupled to the USB ports 127a-n according to data communication protocols set forth by USB standards. The power transmissions supported by USB controller 111 may include incoming charging inputs received via USB ports 127a-n, as well as outgoing power outputs that are transmitted from IHS 100 to USB devices that are coupled to USB ports 127a-n. In some embodiments, USB controller 111 may interoperate with embedded controller 126 in routing power inputs received via USB ports 127a-n to a battery charger 120 supported by the power supply unit 115 of IHS 100. USB controller 111 may negotiate the transmission of power inputs received via USB ports 127a-n, where these power inputs may include USB-PD power inputs as well as high-power inputs of up to 60 volts. Using a high-power conversion circuit 126, the power supply unit 115 may convert received supply inputs of up to 60 volts to voltages (e.g., 18-20 volts) suitable for use in rapidly charging the internal batteries 124 of IHS 100, supporting high-power operations of IHS 100 and/or serving as a power source for external devices that are coupled to a USB port 127a-n of IHS 100. In some scenarios, the operation of power conversion circuit 112 may support power transfers that support high-power operations of the IHS, while still providing sufficient power to also continue in providing power to external devices coupled to a USB port 127an-n of IHS 100. As described in additional detail below, in scenarios where a multimode USB-C adapter according to embodiments is detected as being coupled to one of the USB ports 127a-n, USB controller 111 may receive inputs from embedded controller 126 that direct power received at USB ports 127a-n to be routed to a high-power conversion circuit 128.

Other components of IHS 100 may include one or more I/O ports 116 that support removeable couplings with various types of peripheral external devices. I/O ports 116 may include various types of ports and couplings that support connections with external devices and systems, either through temporary couplings via ports, such as HDMI ports, accessible to a user via the enclosure of the IHS 100, or through more permanent couplings via expansion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124a-n using the available charging inputs. Embedded controller 126 may support routing and use of power inputs received via a USB port 127a-n and/or via a power port 125 supported by the power supply unit 115. In addition, operations of embedded controller 126 may provide battery status information, such as the current charge level of the cells 124a-n of battery 124.

As described in additional detail below, embedded controller 126 may implement operations for utilizing a multimode USB-C power supply in supporting improved charging of the battery system 124 of IHS 100. In particular, embedded controller 126 may interface with power supply unit 115 in monitoring the battery state, such as the charge level, of battery 124. As described in additional detail with regard to FIGS. 4A-C, when the charge level of battery 124 is below a certain threshold, battery 124 is in a pre-charge state during which rapid charging is advantageously avoided due to significant charging inefficiencies. In scenarios where embedded controller 126 determines that battery 124 is in a pre-charge state, embedded controller 126 may transition to utilizing USB-PD charging modes supported by the multimode adapter. Once battery 124 has been sufficiently charged, it enters a bulk-charge state. Upon reaching a bulk charging state, embedded controller 126 may switch to utilizing a high-power charging mode supported by multimode USB-C adapter embodiments described herein. The high-power charging transmission may be efficiently converted using the high-power conversion circuit 128 to a charging voltage suitable for use by the battery charger 120, thus providing rapid charging, supporting high-power operations and serving as a power sources to external devices while operating during a bulk-charge state. In some embodiments, embedded controller 126 may also detect when the charge level of battery 124 exceeds a top-off voltage that exceeds the voltage output generated by the high-power conversion circuit 128, in which case battery system 124 enters a top-off-charge state. Upon reaching a top-off-charge state, embedded controller 126 may switch back to utilizing USB-PD charging modes in order to fully charge battery system 124.

In management of operating modes of IHS 100, embedded controller 126 may implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together to a closed position. In response to lid position sensor detecting latching of the lid of IHS 100, embedded controller 126 may initiate operations for shutting down IHS 100 or placing IHS 100 in a low-power mode.

In this manner, IHS 100 may support the use of various power modes. In some embodiments, the power modes of IHS 100 may be implemented through operations of the embedded controller 126 and power supply unit 115. In various embodiments, a mobile IHS 100 may support various low power modes in order to reduce power consumption and/or conserve power stored in battery 124 when mobile IHS 100 is not actively in use. The power modes may include a fully on state in which all, or substantially all, available components of mobile IHS 100 may be fully powered and operational. In a fully off power mode, processor(s) 101 may powered off, any integrated storage devices 119 may be powered off, and/or integrated displays 108 may be powered off. In an intermediate low-power mode, various components of mobile IHS 100 may be powered down, but mobile IHS 100 remains ready for near-immediate use. In a standby power mode, which may be referred to as a sleep state or hibernation state, state information may be stored to storage devices 119 and all but a selected set of components and low-power functions of mobile IHS 100, such as standby functions supported by embedded controller 126, are shut down.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a DC supply of power. The DC power input received at power port 125 may be utilized by a battery charger 120 for recharging one or more internal batteries 124 of IHS 100. As illustrated, batteries 124 utilized by IHS 100 may include one or more cells 124a-n that may connected in series or in parallel. Power supply unit 115 may support various modes for charging the cells 124a-n of battery system 124 based on the power supply available to IHS 100 and the charge levels of battery 124.

In certain embodiments, power supply unit 115 of IHS 100 may include a power port controller 114 that is operable for configuring operations by power port 125. In certain embodiments, power port controller 114 may be an embedded controller that is a motherboard component of IHS 100, a function supported by a power supply unit 115 embedded controller, or a function supported by a system-on-chip implemented by processors 101. In some embodiments, power port controller 114 may exchange communications, such as PSID (Power Supply Identifier) signals, with a multimode AC adapter coupled to power port 125 in identifying the adapter and negotiating its output. As described in additional detail regard to the below embodiments, in scenarios where a high-power supply is detected as being coupled to power port 125, power port controller 114 may receive inputs from embedded controller 126 directing the power supply input received at power port 125 to be routed to a high-power conversion circuit 128.

Using the high-power conversion circuit 128, the power supply unit 115 converts received supply inputs of up to 60 volts to a voltage (e.g., 18-20 volts) suitable for use in charging the internal battery system 124 of IHS 100 and/or directly powering the operations of IHS 100 and/or providing power to external devices coupled to IHS 100. In scenarios where the supply voltage is being provided via a USB-C port 127a-n, USB-C power cords may be limited to transmitting 5 amps of current. In such instances, the high-power conversion circuit 128 may convert received 5-amp supply inputs of up to 60 volts to a power supply of approximately 18 volts/12 amps that is usable IHS 100. In this manner, high power conversion circuit 128 may support use of USB-C couplings for transmission of power at voltages up to 60 volts and conversion of the supply voltage in a manner that supports power requirements above 200 watts, in some cases above 250 watts.

In some embodiments, high-power conversion circuit 128 may be implemented using a buck converter that includes a set of digital voltage dividers (i.e., digital potentiometers) that may be driven at high frequencies (e.g., 10 MHz) in order to support high-efficiency voltage conversion. In some embodiments, the digital voltage dividers of the high-power conversion circuit 128 may be configured for being driven at high frequencies via the use of switching elements that utilize a GaAs semiconductor, as the inventors have recognized this configuration provides efficiency improvements over existing power supply techniques used to deliver power in the range of 60 volts. Existing buck converters that are utilized to support IHS power supplies operate using analog, capacitive voltage dividers. When converting a 54-volt input to an 18-volt output using such existing capacitive buck converters, conversion efficiencies are typically around 88%, thus generating up to 25 watts of heat. By utilizing digital voltage dividers driven at high frequencies, up to 98% conversion efficiencies may be obtained. Through such high efficiency conversion, heat dissipation remains manageable at approximately 5 watts. In some embodiments, high-power conversion circuit 128 may be a buck-boost converter, where the buck operations utilize digital voltage dividers and boost operations may be implemented using capacitive or inductive converts. As described in additional detail with regard to FIG. 2B, in embodiments where high-power conversion circuit 128 includes buck and boost capabilities, a multimode AC adapter according to embodiments may include the same high-power conversion circuit 128 that utilizes the converter's boost capabilities to efficiently generate outputs of up to 60 volts for transmission to IHS 100, where the circuit's buck capabilities are used to efficiently convert the supply to a voltage suitable for use by the IHS.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
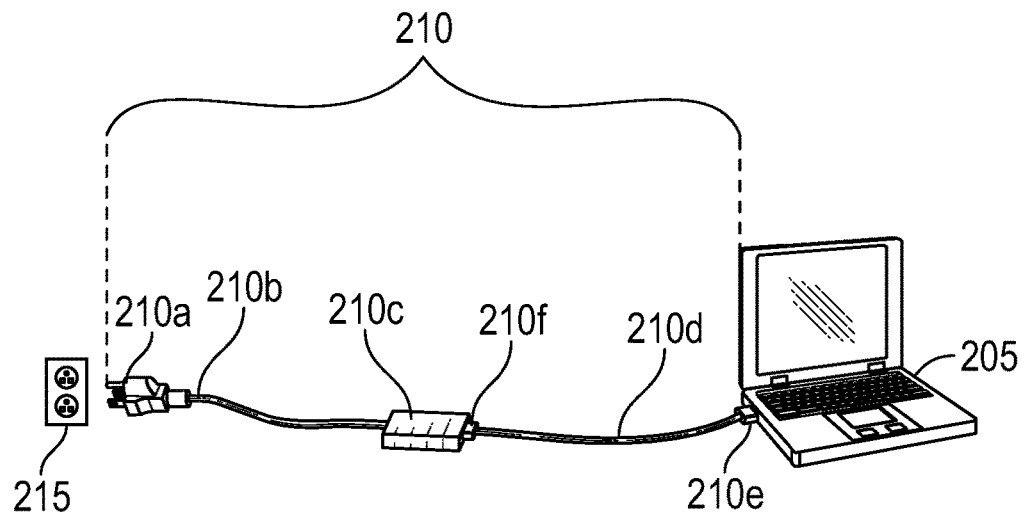
FIG. 2A is a diagram depicting certain components of multimode USB-C power supply system, according to various embodiments, that includes an AC adapter that is coupled to an IHS that is a laptop computer.

FIG. 2A is a diagram depicting components of multimode power system according to various embodiments, where that system includes a multimode AC power adapter 210 coupled to an IHS that is a laptop computer 205. Multimode AC adapter 210 may be capable of providing supply voltages to laptop 205 that may include standard USB-PD output voltages, as well as high-power output voltages of up to 60 volts, such as for use during a bulk-charge state. Power provided by AC power adapter 210 may be used to charge the internal batteries of laptop computer 205 using power supplied via a power port or via a USB-C port of laptop 205. Via these supported power supply modes, multimode AC power adapter 210 may be used to charge the batteries of various types of portable IHSs, such as tablets, 2-1 laptops, convertible laptops, smartphones, smart watches, cameras, toys, gaming accessories, and various other types of devices. Embodiments may be implemented using all varieties of IHSs that operate on DC power supplied using rechargeable batteries and that charge these batteries using DC power converted by an AC adapter 210.

A multimode AC power adapter 210 according to embodiments may include several connected components that operate to draw AC power from an electrical outlet 215 and convert the AC power to a DC output for delivery to an IHS, such as the laptop 205 of FIG. 2. One end of the AC power adapter 210 includes an AC plug 210a that includes prongs that may be inserted into slots provided by an AC electrical outlet 215. Many different types of AC plugs 210a are utilized throughout the world, with different plugs from different regions utilizing different numbers, shapes and orientations of the prongs that conform to the electrical outlets used in a region. In North America, most general-purpose electrical outlets deliver 120 V of AC at a frequency of 60 hertz.

As illustrated, an AC electrical cord 210b of multimode AC adapter 210 connects AC plug 210a to multimode converter 210c. In many embodiments, AC electrical cord 210b may be removeable from converter 210c. Embodiments may also include AC electrical cords 210b that are fixed to converter 210c. A function of a multimode converter 210c is to convert the AC received from power cord 210b to a DC output that can be used to power IHSs that are compatible with the AC adapter 210. In certain instances, converter 210c may be referred to as a power brick. In some embodiments, multimode converter 210c may generate outputs in accordance with USB-PD protocols and may also generate high-power outputs that exceed the maximum 20 volts outputs of USB-PD, such as outputs up to 60 volts. In this manner, a multimode converter 210c may support multiple output supply modes, thus providing support for providing power to a range of IHSs, including IHSs such as high-power laptop computers. In some scenarios, the ability to efficiently support high-power supply modes, such as for use during a bulk-charge state, that allow high-power operations of the IHS 205 to be supported while still providing sufficient additional power to serve as a power source for devices coupled to IHS 205.

In some embodiments, the multimode AC power adapter may support a nominal high-power charging transmission of 54 volts, thus allowing for 10 percent fluctuations in the actual charging output while still maintaining outputs below 60 volts. Typical embodiments may support other nominal charging supply voltages between 50 volts and 60 volts depending on the anticipated fluctuations in the actual charging input. Many embodiments may support nominal supply voltages ranging from 54 volts to 56 volts. Some embodiments may be configured to support charging supply voltages significantly below 50 volts.

In supporting these multiple output supply modes, converter 210c may support identification of the multimode AC adapter 210 to the coupled IHS, where this identification information may be utilized in configuring the DC power output generated by converter 210c and transmitted to IHS 205. Converter 210c may also support capabilities for negotiating with IHS 205 to determine the parameters of the DC output supply voltage generated by converter 210c. The DC output generated by converter 210c is provided to laptop 205 via a DC power cord 210d that supplies the DC output via a connector that is received by a port of the laptop.

DC cord 210d includes a DC plug 210f that may be received by a port of converter 210c. In the illustrated embodiment, the DC plug 210f is a USB-C connector that is received by a USB-C port of converter 210c. The DC plug 210e on the opposite end of DC cord 210d may be an identical to DC plug 210f and may thus also be a USB-C connector that is received by a USB-C port 205b of IHS 205. In such embodiments, DC cord 210d may be a reversible USB-C cable with USB-C connectors on each end. In some embodiments, multimode AC adapter 210 may also support use of a DC cord 210d that, instead of USB-C connectors, includes a barrel connector for DC plug 210f that is received by a corresponding power port of converter 210c and also includes a barrel connector for DC plug 210e that is received by a power port 205a of IHS 205. In some embodiments, a DC cord 210d utilizing barrel connector DC plugs 210e and 210f may be reversible. In some embodiments, converter 210c may include both one or more USB-C ports and a barrel connector power port, thus supporting two types of removeable DC cords 210d. In some embodiments, converter 210c may support a single fixed DC cord 210d that may be a USB-C cord or a DC power code utilizing a barrel connector. As described, embodiments may support the transmission of power at voltages up to 60 volts, while adhering to the 5-amp limitation on some USB-C cords 210d. The high-power conversion circuit of IHS 205 may then be used to efficiently convert the transmitted power to a usable voltage in a manner that may provide over 200 watts of power to IHS 205. Through use of the high-power conversion circuit, high-power IHSs may be supported using thin USB-C cords 210d, thus promoting the use of thinner and more portable multimode AC adapters 210 for use by a large range of IHSs, including IHSs capable of utilizing more than 200 watts of power, and in some cases up to 250 watts of power. In addition, the efficient conversion provided by the high-power conversion circuit supports the use of thinner barrel connectors and thinner cabling for DC cords that are received by the power port of the IHS. As described, IHSs continue to get thinner and more portable. In some IHSs, the IHS power port that receives a cylindrical barrel connector is one of the thickest components of the IHS. By supporting thinner barrel connectors, the diameter of the power ports supported IHSs can also be reduced, thus providing an opportunity to make IHSs still thinner.

Figure 2B:
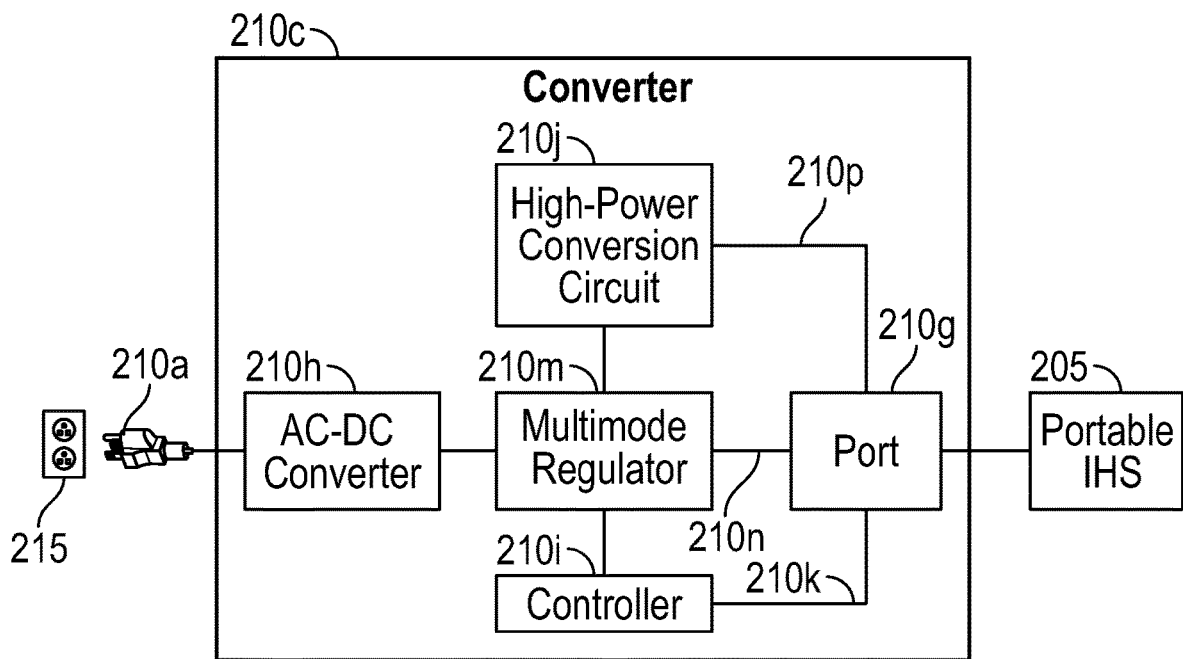
FIG. 2B is a diagram depicting certain additional components of a multimode power supply system, according to various embodiments, that includes an AC adapter that is coupled to an IHS.

FIG. 2B is a diagram depicting additional components of a multimode power system according to various embodiments, where the system includes a multimode converter 210c of AC power adapter coupled to an IHS 205. In FIG. 2B, certain of the internal components of a multimode converter 2101c, according to some embodiments, are illustrated. Multimode converter 210c receives AC power drawn from AC outlet 215 and provides portable IHS 205 with a supply of DC power. Multimode converter 210c may utilize an AC/DC converter 210h that receives the AC power and generates a supply of DC power that may be supplied to a multimode regulator 210m. Based on configurations provided by a controller 210i of the converter 210c, multimode regulator 210m may supply a regulated supply of DC power to a power port 210g of the converter or to a high-power conversion circuit 210j.

As described, in some embodiments, converter 210c may be coupled to mobile IHS 205 via a USB-C cable. Other embodiments may utilize a DC cable that couples to IHS 205 via a barrel connector coupling. The DC cabling, whether USB-C or a DC barrel connector cabling, may be received by a port 210g of the converter. The DC cable may be removable from port 210g, or may be fixed to port 210g. In some embodiments, converter 210c may include separate USB-C and DC barrel connector ports that may operate in the manner described for port 210g. Upon the AC converter being coupled to IHS 205, converter 210c and IHS 205 may initiate handshake procedures for identifying the capabilities of the AC adapter and in negotiating an output of converter 210c.

In USB-C embodiments, controller 210i of converter 210c and a USB controller of IHS 205, such as USB controller 111 of FIG. 1, may initiate USB-PD communications via a data pin of the USB-C coupling in determining the USB-PD outputs supported by converter 210c and in negotiating a USB-PD output (e.g., 5V, 9V, 15V, 20V) to be supplied to IHS 205 by converter 210c. Additionally, embodiments may supplement these USB-PD communications with additional communications conducted between controller 210i and the USB controller of IHS 205 via a data pin of the USB-C coupling. These additional communications may identify converter 210c as being a multimode converter capable of providing high-power outputs of up to 60 volts. The additional communications may also support negotiating a particular supply output by converter 210c, such as upon indication of a change in battery states. In some embodiments, these additional communications for supporting high-power operations may be PSID signals that are transmitted along data pins of the USB-C coupling.

In embodiments that utilize a DC coupling with a barrel connector, a similar negotiation may be conducted between controller 210i of converter 210c and a power port controller of IHS 205, such as power port controller 114 of FIG. 1. In such embodiments, controller 210i and the power port controller of IHS 205 may exchange PSID messages via a data line included in the DC cabling. The exchanged PSID messages may identify converter 210c as a multimode converter capable of generating high-power outputs, as well as specifying ordinary power outputs that are supported by the converter. Additional PSID messages may be exchanged that negotiate a supply output by converter 210c, such as upon indication of a change in battery states.

As indicated in FIG. 2B, controller 210i may utilize a data pathway 210k in receiving data line communications received by port 210g, whether the port is a USB-C port that transmits USB data pin communications or whether port 210g is a DC port relaying on PSID communications. Based on such data communications, controller 210i may specify the capabilities of converter 210c to IHS 205 and may negotiate the output to be supplied by converter 210c. Once the supply output of converter 210c has been negotiated, controller 210i may configure multimode regulator 210m for generating the negotiated output. As described in additional detail, below the output of converter 210c may be re-negotiated in this manner upon detecting a change in battery state. In some instances, port 210g may be a USB-C power cord and controller 210i may negotiate a USB-PD output by converter 210c. In such instances, controller 210i may configure multimode regulator 210m to deliver a USB-PD output, via power pathway 210n, to port 210g. In other instances, controller 210i may negotiate a high-power output by converter 210c, such as during a bulk-charge state. In such instances, controller 210i may configure multimode regulator 210m to route its output to high-power conversion circuit 210j for generating a high-power output of a voltage up to 60 volts and delivering greater than 200 watts of power.

As described with regard to FIG. 1, a high-power conversion circuit 128 may be utilized by an IHS 100 to efficiently convert high-power supply inputs of up to 60 volts to a voltage (e.g., 18-20 volts) suitable of use by IHS 100. In some embodiments, the high-power conversion circuit 128 of IHS 100 may be a buck-boost converter that may include capacitive and/or inductive boost capabilities. In some embodiments, the boost capabilities of this same buck-boost, high-power conversion circuit 210j may be utilized by multimode AC converter 210c in efficiently generating high-power supply outputs. In such embodiments, the same conversion circuit may be utilized by both the power supply unit of IHS 205 and the AC converter 210c. In some embodiments, boost capabilities of a high-power conversion circuit 210j may be implemented using capacitive elements, such as switched capacitors that may be driven at high frequencies in order to provide high-efficiency conversions with as little as 2% loss. Such capacitive conversion elements provide efficient conversions but are capable of supporting only a limited number of conversion ratios, thus limiting the use of capacitive elements to use in converting a certain set of input and output voltages. Some embodiments may additionally or alternatively implement boost capabilities using inductive elements, thus operating at reduced efficiencies, but providing the ability to support a wider range or conversions. In some embodiments, the high-power conversion circuit 210j included in multimode AC converter 210c may include only boost converter capabilities, and may thus provide complimentary capabilities to a buck converter or buck-boost high-power conversion circuit 128 in the coupled IHS 205.

Figure 3:
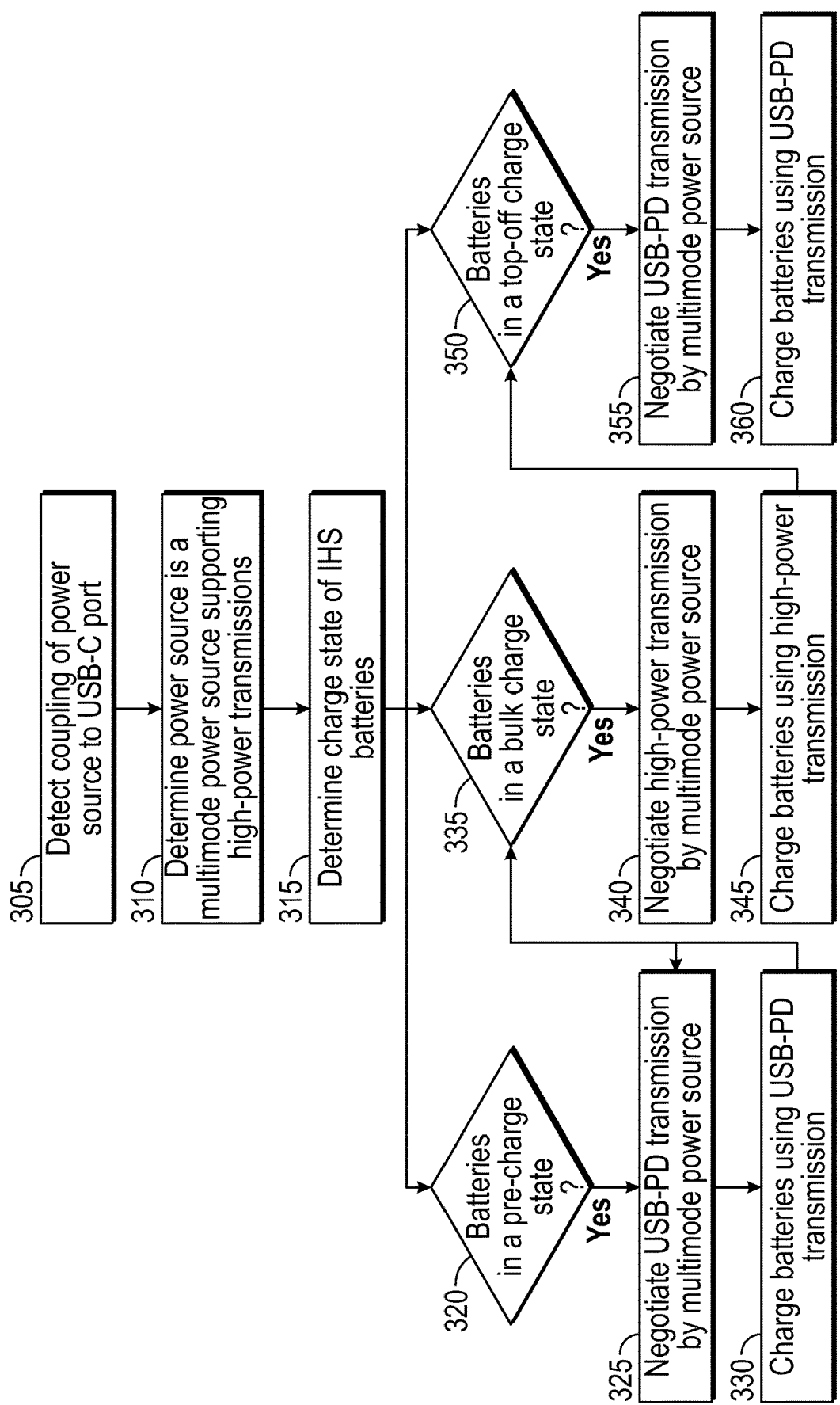
FIG. 3 is a flow chart diagram illustrating certain steps of a process according to various embodiments for multimode transmission and conversion of power delivery to an IHS in a manner that provides improved battery charging.

FIG. 3 is a flow chart illustrating steps of a process according to various embodiments for multimode transmission and conversion of power delivery to an IHS in a manner that provides improved battery charging. In some scenarios, embodiments may begin at block 305 with the coupling of a power source to a USB-C port of an IHS. As described with regard to FIG. 1, an IHS according to embodiments may include a USB controller that detects the coupling of a device to one or more USB-C ports supported by the IHS. For instance, upon coupling a USB-C connector of an AC adapter, such as multimode AC adapter 210 described with regard to FIGS. 2A and 2B, to a USB-C port of an IHS, a USB controller of the IHS may detect a voltage on one or more power pins of the USB-C port In response to detecting a coupling of a power source to a USB-C port, at block 310, an IHS according to embodiments may determine whether the power source is a multimode USB-C adapter that supports high-power supply transmissions. In certain embodiments, the converter portion of a USB-C adapter, such as converter 210c of FIGS. 2A and 2B, may include circuitry and/or logic that detects a voltage being drawn by an IHS via the DC power cord of the adapter. In such embodiments, upon detecting a voltage drawn by the IHS, the multimode USB-C adapter may be configured to generate a USB-PD communication that is transmitted on a data channel supported by the USB-C adapter. In some embodiments, the multimode USB-C adapter may signal capability for delivering high-power transmissions via the transmission of additional or alternative signals that may also be communicated via data pathways supported by the USB-C coupling. The USB controller of the IHS may detect the transmission of such USB-PD communications or other communications by the multimode USB-C adapter. The multimode adapter communications or may be detected and processed by the USB controller, and may be forwarded to an embedded controller, such as embedded controller 126 of the IHS of FIG. 1, that supports certain power mode configurations of the IHS. Based on the received multimode adapter communications, the embedded controller may determine characteristics of the multimode USB-C adapter, such as whether it supports high-power supply transmissions, as well as the USB-PD modes that are supported.

As described, an IHS according to embodiments may include an embedded controller that is configured to interface with the power supply unit of the IHS in determining state information for the battery system of the IHS. At block 315, such a battery monitoring capability may be initiated and utilized in order to determine the state of the IHS battery system. In some embodiments, the battery state may specify a charge state of the battery system, such as by providing a voltage reading of the battery system. In other embodiments, the battery state may specify a current charge state, such as an indication that the battery is in a pre-charge state, a bulk-charging state, or a top-off-charge state. As illustrated in FIG. 3, based on the determined battery state, different charging modes may be configured by the embedded controller.

In some scenarios, the charge state may indicate, at block 320, that the battery system of the IHS is in a pre-charge state. The battery system may be discharged through operation of an IHS that is not coupled a power source. In some battery systems, discharge of battery below a low battery charge threshold may trigger a protection mode that maintains a minimal charge level for use in supporting certain core functions and initiating charging operations once a power source is available. Once a power source becomes available, the battery system may initiate diagnostics operations. During such diagnostic operations, a battery system may be limited to use of the power this is required for conducting the battery diagnostics. Consequently, while operating in a pre-charge state, such a battery system may be unable to utilize all available power for battery charging.

While a battery system is in a pre-charge state, the battery system may be limited to providing efficient support only for low-current operations, such as the diagnostic operations. In some embodiments, a battery system in a pre-charge state may efficiently support low-current operations within an approximate range of 100-200 mA. If currents in excess of 200 mA are provided to a battery system while in a pre-charge state, some charging of battery system may be possible, but charging in such conditions may result in highly inefficient charging performance. Accordingly, while in a pre-charge state, a battery system may be unable to conduct high-current operations, such as efficient battery charging. In some instances, the power limitations during a pre-charge state may be variable during diagnostic operations. For example, preliminary diagnostic operations may support efficient use of low currents (e.g., less than 125 mA), but once preliminary diagnostic operations are successfully completed, continuing diagnostic operations may utilize higher currents (e.g., 150-200 mA) within the pre-charge state limitations.

With the battery system determined to be in a pre-charge state, at block 325, an appropriate USB-PD transmission by the coupled multimode AC adapter may be negotiated. As described with regard to FIG. 1, an IHS according to embodiments may include an embedded controller that is configured to manage certain power operations of IHS. In such embodiments, an embedded controller may negotiate with the multimode AC adapter for a USB-PD transmission that is compatible with the power limitations on operations conducted during a pre-charge state of battery system. In embodiments where the multimode AC adapter is a multimode USB-C adapter such as described with regard to FIGS. 2A and 2B, the embedded controller may negotiate an USB-PD output transmission that is suitable for the limitations of the pre-charge state and that is suitable for the current charge level of the battery system.

In some embodiments, the negotiated USB-PD transmission by the multimode AC adapter is determined based on a charge level of the battery system. As described with regard to FIG. 1, a rechargeable IHS battery may be comprised of multiple connected battery cells. Depending on the number of cells that comprise a battery, a battery pre-charge state may be indicated by different battery voltage readings. For instance, in a two-cell battery, a pre-charge state may be indicated by voltage readings between 2-6 volts. Voltage readings in a two-cell battery that are below 2 volts may indicate a battery failure, and voltage readings greater than 6 volts may indicate a standard, bulk-charge state. In a three-cell battery, a pre-charge state may be indicated by voltage readings between 3 and 9 volts, with readings below 3 volts indicating battery failure and readings greater than 9 volts indicating a bulk-charge state. In a four-cell battery, a pre-charge state may be indicated by voltage readings between 4 and 12 volts, with readings below 4 volts indicating battery failure and readings greater than 12 volts indicating a bulk-charge state.

When negotiating a USB-PD transmission by a multimode AC adapter during a pre-charge state of the battery system, the negotiated output may be selected based on voltage readings of the battery system. The delivered USB-PD transmission may be utilized, at block 330, in charging the battery system. For instance, in a three-cell battery system that returns a voltage reading of 3.5 volts, a USB-PD transmission of 5 volts may be selected. Such USB-PD transmissions are delivered at 150 mA, which is within the limited range of currents that are suitable for use during a pre-charge battery state. Upon reaching a 5-volt charge, the battery system remains in a pre-charge state, but the output of the multimode AC adapter may be re-negotiated to deliver a 9-volt USB-PD transmission, still delivered at 150 mA.

Upon reaching a 9-volt charge, the battery system is no longer in a pre-charge state and transitions to a standard bulk-charge state during which greater currents may be used in rapidly charging the battery system, supporting high-power operations and/or powering external devices coupled to the IHS. At block 335, a transition to a bulk-charge state may be detected by the embedded controller of the IHS. In order to initiate rapid charging during this bulk-charge state, at block 340, a high-power transmission by the multimode AC adapter may be negotiated. As described, a multimode AC adapter according to embodiments may be configured to deliver up to 60 volts of charge to an IHS via a USB-C coupling. As described with regard to FIG. 1, upon negotiating a high-power transmission by a multimode AC adapter, the embedded controller may route the high-power transmission to a high-power conversion circuit of the IHS power supply unit. The high-power conversion circuit may utilize a set of digital voltage dividers in efficiently converting the delivered high-power voltage to a lower voltage (e.g., 18-20 volts) suitable for use by the battery system.

As described with regard to the high-power conversion circuit of FIG. 1, existing conversion circuits typically utilize analog voltage dividers in converting received supply voltages to a voltage for use by the battery charging system. Embodiments may utilize a set of digital voltage dividers that generate significantly less heat than analog voltage dividers in performing such conversions. For instance, the embedded controller may negotiate a 54-volt transmission by a multimode AC adapter, which may be converted to an 18-volt output using the digital voltage dividers of the high-power conversion circuit. Implementing this particular conversion using existing analog voltage dividers may require three or more analog voltage dividing circuits, thus resulting in conversion efficiencies of approximately 88 percent. Such levels of inefficiency not only result in wasted power, but also may generate up to 25 watts of heat within the IHS conversion circuit. Digital voltage divider conversion may result in efficiencies approaching 98 percent, thus resulting in a loss of approximately 5 watts. In some embodiments, the embedded controller may negotiate a lower supply voltage with the AC adapter, thus requiring use of only a single digital voltage divider by the high-power conversion circuit to reach an 18-volt output via a 36 volt transmission, while generating even less heat.

Using the output of the high-power conversion circuit, at block 345, the batteries of the IHS may be charged, high-power operations may be supported and/or external devices coupled to the IHS may be powered. As described, the high-power conversion circuit may efficiently convert a 54-volt power supply to a charging voltage of approximately 18 volts. In this manner, the high-power charging transmission of a multimode AC adapter may be used to generate over 200 watts of power during the bulk-charge state. In some scenarios, however, the output of the high-power conversion circuit may not be suitable for charging the battery system to a fully charged state. For instance, some battery systems may store up to 20 volts of charge. In scenarios where the high-power conversion circuit is configured to generate an 18-volt output, the high-power transmission that is used during the bulk-charge state may not be suitable for topping off the battery charge to 20 volts.

Based on the monitored voltage readings of the battery system throughout the charging process, at block 350, a top-off-charge state may be detected in scenarios where the voltage capacity of the battery system is greater than a voltage output of the high-power conversion circuit. Upon detecting a transition to a top-off-charge state, at block 355, a USB-PD transmission by the multimode AC adapter may be negotiated. For instance, the embedded controller of the IHS may interface with the USB controller to negotiate a USB-PD 20-volt transmission by the multimode USB-C adapter. Using this 20-volt transmission during a top-off-charge state, the battery system may be fully charged.

Figure 4A:
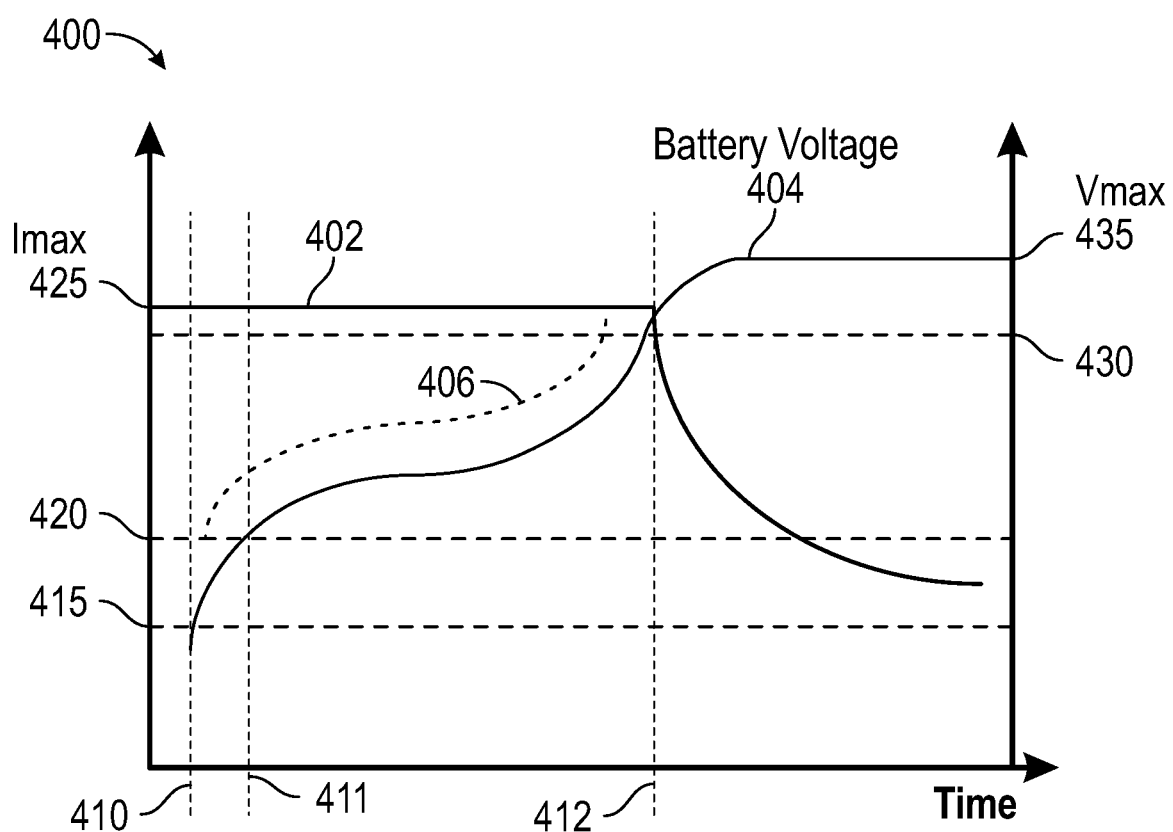
FIG. 4A is a graph diagram illustrating certain aspects of the operation of a system configured according to various embodiments for providing multimode USB-C power transmission and conversion in support of improved battery charging.

FIG. 4A is a graph diagram 400 illustrating certain aspects of the operation of a system configured according to various embodiments for providing multimode USB-C power transmission and conversion in support of improved battery charging. Diagram 400 plots a curve 404 that illustrates voltage readings of a battery system over time. As described, a battery system may be characterized as being within a pre-charge state during certain low-voltage scenarios that very based on the number of cells included in the battery system. In the illustrated scenario, pre-charge state may be defined by battery readings from voltage 415 to voltage 420. Voltage readings below voltage 415 may indicate a failure condition that requires replacement and/or remediation of the battery system. As described, while battery voltages remain in a pre-charge state between voltages 415 and 420, battery system operations may be limited to efficiently supporting only diagnostics and other low-current operations that do not include standard charging operations. Voltage readings above voltage 420 may correspond to the described bulk-charge state during which efficient charging inputs may be used.

Accordingly, at time 410, embodiments may initiate use of USB-PD transmissions by a multimode AC adapter for charging during a pre-charge state. At time 411, embodiments may detect a transition to a bulk-charge state and initiate a corresponding transition to use of high-power charging transmissions by a multimode AC adapter. As described, in some instances, the high-power charging transmissions may be converted to a charging voltage that is less than the voltage capacity of battery system. This is reflected in FIG. 4A by voltage 430 which corresponds to the voltage output of the high-power conversion circuit, which is less than the voltage capacity 435 of the battery system. In such scenarios, at time 412, the battery system transitions to a top-off-charge state, during which embodiments may initiate a corresponding transition to the use of USB-PD transmissions by the multimode AC adapter.

Figure 4B:
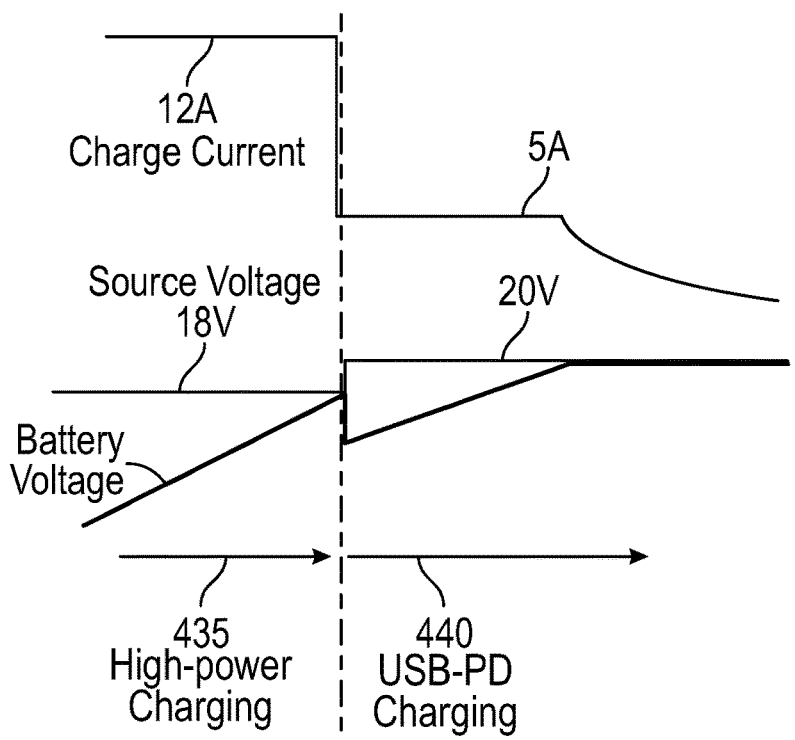
FIG. 4B is an additional graph diagram illustrating certain additional aspects of the operation of a system configured according to various embodiments for providing multimode USB-C power transmission and conversion in support of improved battery charging.

FIG. 4B is an additional graph diagram illustrating certain additional aspects of the operation of a system configured according to various embodiments for providing multimode USB-C power transmission and conversion in support of improved battery charging. As described, a high-power conversion circuit according to embodiments may be used to convert high-power voltage transmissions to voltages suitable for use by a battery charging system. In some embodiments, high-power transmissions of approximately 54 volts may be efficiently converted to an 18-volt output by a high-power conversion circuit implemented using of digital voltage dividers. For 20-volt battery systems, the 18-volt output of the high-power conversion circuit is insufficient to fully charge such batteries. Accordingly, embodiments may transition to the use of USB-PD charging transmissions during this top-off-charge state between 18 and 20 volts.

As indicated in phase 435 of FIG. 4B, the 18-volt output of a high-power conversion circuit may be delivered at 12 amps. Upon detecting a transition from a bulk-charge state to a top-off-charge state, charging may be transitioned to a USB-PD 20 volt charging transmission that is delivered at 5 amps, as indicated in phase 440. As a result of this drop in the charging current, a corresponding drop results in the voltage of the battery system. As reflected in FIG. 4B, the battery voltage drops below 18 volts upon initiating the transition to the 5-amp USB-PD charging transmission. Nonetheless, the battery is gradually charged to 20 volts using the 20-volt USB-PD charging transmission.

Figure 4C:
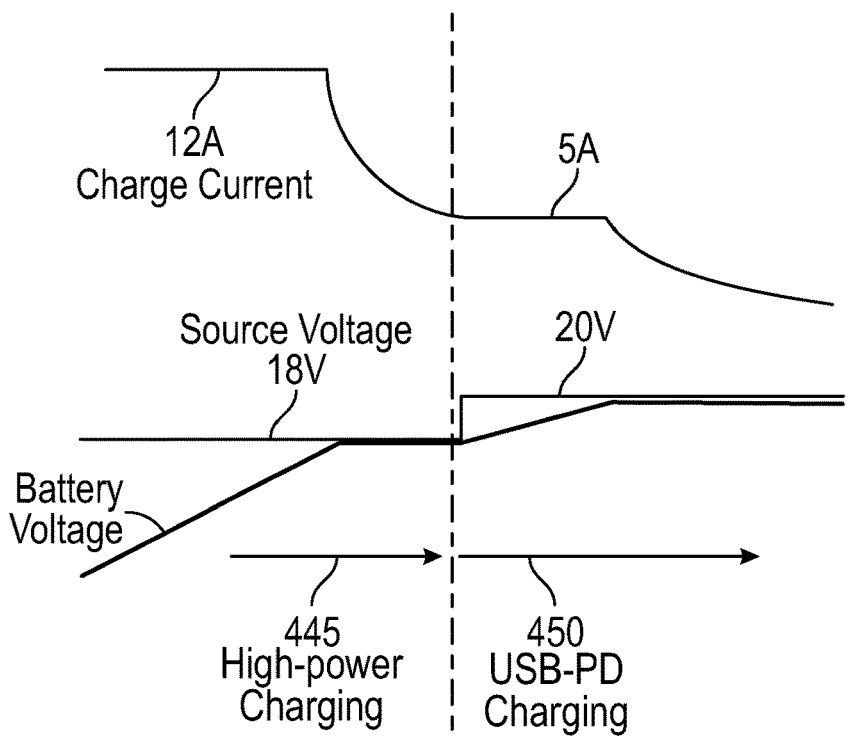
FIG. 4C is an additional graph diagram illustrating certain additional aspects of the operation of a system configured according to various embodiments for providing multimode USB-C power transmission and conversion in support of improved battery charging.

FIG. 4C is an additional graph diagram illustrating certain additional aspects of the operation of a system configured according to various embodiments for providing multimode USB-C power transmission and conversion in support of improved battery charging. In particular, FIG. 4C illustrates a technique for reducing the time required to charge the battery system to a full charge once a top-off charge state has been reached. As described with regard to FIG. 4B, a transition from a 12 amp output of the high-power conversion circuit to a 5 amp output of a USB-PD charging transmission results in a drop in the battery voltage, thus resulting in a delay in the time required to fully charge the battery system.

In the embodiment of FIG. 4C, rather than transition to USB-PD charging immediately upon detecting a battery voltage equal to the voltage output of the high-power conversion circuit, this transition may instead be delayed until the charging current that is being accepted by the battery system has dropped to 5 amps, or another output current to be used upon transitioning to USB-PD top-off charging. In such embodiments, charging continues throughout phase 445 using the 18 volt/12 amp output of the high-power conversion circuit, even though the battery voltage has reached 18 volts. During this period, the impedance of the battery system causes a current-following behavior resulting in a tapering of the current that is accepted by the battery system. Upon detecting that the current being accepted by the battery system has tapered to 5 amps, embodiments may then transition to phase 450 to charging using a 20-volt USB-PD charging transmission. As reflected in FIG. 4C, by utilizing such a current-following transition, the transition to USB-PD charging does not result in an immediate drop to charging at 5 amps. Instead, charging continues during this tapered transition period at currents greater than 5 amps, thus reducing the charge time compared to the scenario of FIG. 4B.

In some embodiments, a tapered transition may be additionally or alternatively triggered based the power being drawn by the battery system. For instance, a transition to top-off charging using USB-PD transmissions may be initiated upon detecting 90 watts of power being drawn by the charging system, thus indicating a point of seamless transmission to a 90-watt USB-PD output. In some embodiments, the transition to top-off charging may be triggered upon detecting 65 watts of power being drawn by the charging system, thus providing an opportunity to seamlessly transition to a 65-watt USB-PD output. By transition to top-off charging at power draws of 65-watts, embodiments may avoid the need for power factor correction in the power supply unit of the IHS when compared to transitioning to top-off charging upon detecting 90-watt power draws by the charging system. In such instances, power factor correction circuits may be eliminated, thus simplifying the power supply unit of the IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for charging a battery system of an Information Handling System (IHS) using a multimode AC adapter, the method comprising:
   determining, based on information reported by the multimode AC adapter to a power supply unit of the IHS, the multimode AC adapter supports USB-PD transmission and also supports high-power transmissions of a voltage greater than voltages of the supported USB-PD transmissions;
   monitoring, by an embedded controller of the IHS that interfaces with the power supply unit, a charge state of the battery system;
   when the charge state of the battery system comprises a pre-charge state indicating a low charge level in the battery system, charging, by the power supply unit, the battery system using a first USB-PD transmission that is negotiated as an output of the multimode AC adapter;
   when the charge state of the battery system comprises a bulk-charge state, charging, by the power supply unit, the battery system using a high-power transmission that is negotiated as an output of the multimode AC adapter, wherein a high-power conversion circuit of the power supply unit of the IHS converts the high-power transmission to an upper voltage limit supported by the high-power conversion circuit; and
   when the charge state of the battery system comprises a top-off-charge state indicated by the remaining voltage capacity of the battery system being greater than the upper voltage limit supported by the high-power conversion circuit, charging, by the power supply unit, the battery system using a second USB-PD transmission that is negotiated as an output of the multimode AC adapter.

2. The method of claim 1, wherein the high-power transmission negotiated by the multimode AC adapter during the bulk-charge state of the battery system comprises a nominal voltage of approximately 54 volts and a peak voltage not exceeding 60 volts.

3. The method of claim 1,
   wherein the high-power conversion circuit converts a high-power transmission of 54 volts to an 18 volt supply for charging the battery system.

4. The method of claim 1, wherein the high-power conversion circuit comprises a plurality of digital voltage dividers operable for converting the high-power transmission to a voltage for charging the battery system.

5. The method of claim 1, wherein the high-power conversion circuit generates greater than 200 watts of power in converting the high-power transmission to a voltage for charging the battery system.

6. The method of claim 1, wherein the pre-charge state is determined based on a number of cells in the battery system.

7. The method of claim 6, wherein the battery system is in a protection mode due to the low charge level of the battery system.

8. The method of claim 1, wherein the bulk-charge state comprises a charge level of the battery system supporting charging of the battery system using a standard charging current.

9. The method of claim 1, wherein the upper voltage limit of the high-power conversion circuit is 18 volts based on a high-power transmission of 54 volts by the multimode AC adapter.

10. A system for charging a battery system of an Information Handling System (IHS), the system comprising:
    a multimode AC (Alternating Current) adapter configured to report supported transmissions comprising USB-PD (Universal Serial Bus Power Delivery) transmissions and further comprising high-power transmissions of a voltage greater than voltages of the of USB-PD transmissions; and
    the IHS configured to:
      monitor a charge state of the battery system;
      when the charge state comprises a pre-charge state indicating a low charge level in the battery system, charge the battery system using a first USB-PD transmission that is negotiated as an output of the multimode AC adapter;
      when the charge state comprises a bulk-charge state, charge the battery system using a high-power transmission that is negotiated as an output of the multimode AC adapter, wherein a high-power conversion circuit of the IHS converts the high-power transmission to an upper voltage limit supported by the high-power conversion circuit; and
      when the charge state comprises a top-off-charge state indicated by the remaining voltage capacity of the battery system being greater than the upper voltage limit supported by the high-power conversion circuit, charge the battery system using a second USB-PD transmission that is negotiated as an output of the multimode AC adapter.

11. The system of claim 10, wherein the high-power charging transmission negotiated by the multimode AC adapter during the bulk-charge state of the battery system comprises a nominal voltage of approximately 54 volts and a peak voltage not exceeding 60 volts.

12. The system of claim 10, wherein the high-power conversion circuit converts a high-power transmission of 54 volts to an 18 volt supply for charging the battery system.

13. The system of claim 10, wherein the operation of the power circuit generates greater than 200 watts of power in converting the high-power transmission to a voltage for charging the battery system.

14. The system of claim 10, wherein the pre-charge state is determined based on a number of cells in the battery system.

15. The system of claim 10, wherein the bulk-charge state comprises a charge level of the battery system supporting charging of the battery system using a standard charging current.

16. The method of claim 10, wherein the upper voltage limit of the high-power conversion circuit is 18 volts based on a high-power transmission of 54 volts by the multimode AC adapter.

17. An Information Handling System (IHS) supporting power transmissions by a multimode AC adapter, the IHS comprising:
    one or more processors;
    a memory device coupled to the one or more processors, the memory device storing computer-readable instructions that, upon execution by the one or more processors, cause execution of an operating system of the IHS;
    a battery system; and an embedded controller comprising a memory having program instructions stored thereon that, upon execution by a logic unit of the embedded controller, cause the embedded controller to:

determine, based on information reported by the multimode AC adapter, the multimode AC adapter supports USB-PD transmission and also supports high-power transmissions of a voltage greater than voltages of the supported USB-PD transmissions;

monitor a charge state of the battery system;

when the charge state comprises a pre-charge state indicating a low charge level in the battery system, charge the battery system using a first USB-PD transmission that is negotiated as an output of the multimode AC adapter;

when the charge state comprises a bulk-charge state, charge the battery system using a high-power transmission that is negotiated as an output of the multimode AC adapter, wherein a high-power conversion circuit of the power supply unit of the IHS converts the high-power transmission to an upper voltage limit supported by the high-power conversion circuit; and when the charge state comprises a top-off-charge state indicated by the remaining voltage capacity of the battery system being greater than the upper voltage limit supported by the high-power conversion circuit, charge the battery system using a second USB-PD transmission that is negotiated as an output of the multimode AC adapter.

18. The IHS of claim 17, the high-power transmission negotiated by the multimode AC adapter during the bulk-charge state of the battery system comprises a nominal voltage of approximately 54 volts and a peak voltage not exceeding 60 volts.

19. The IHS of claim 17, wherein the pre-charge state is determined based on a number of cells in the battery system.

20. The IHS of claim 17, wherein upper limit of the high-power conversion circuit power circuit is 18 volts based on a high-power transmission of 54 volts by the multimode AC adapter.

* * * * *